United States Patent [19]

MacDonald

[11] Patent Number: 4,492,890
[45] Date of Patent: Jan. 8, 1985

[54] STATOR WINDING PROVIDING MAGNETOMOTIVE FORCE WAVE OF REDUCED HARMONIC CONTENT

[75] Inventor: Daniel J. MacDonald, Brookfield, Wis.

[73] Assignee: Litton Industrial Products, Inc., Beverly Hills, Calif.

[21] Appl. No.: 495,809

[22] Filed: May 18, 1983

[51] Int. Cl.³ .............................................. H02K 3/00
[52] U.S. Cl. .................................. 310/184; 310/198; 310/204; 310/206
[58] Field of Search ............... 310/180, 184, 45, 198, 310/204, 200, 205, 201, 206, 202, 207, 203, 208

[56] References Cited

U.S. PATENT DOCUMENTS

| | | | |
|---|---|---|---|
| 3,325,661 | 6/1967 | Parsons | 310/184 |
| 3,515,922 | 6/1970 | Fong | 310/202 |
| 3,600,619 | 8/1971 | Tiarks | 310/180 |
| 3,794,870 | 2/1974 | Broadway | 310/198 |
| 4,013,909 | 3/1977 | Broadway | 310/180 |
| 4,158,788 | 6/1979 | Godwin | 310/198 |
| 4,394,596 | 7/1983 | Kimura | 310/184 |
| 4,409,507 | 10/1983 | Godwin | 310/184 |

FOREIGN PATENT DOCUMENTS 2921224 12/1979 Fed. Rep. of Germany ...... 310/180

OTHER PUBLICATIONS

Puchstein et al., Alternating Current Machines, pp. 24-27, Wiley & Sons, New York.
Dawes, A Course in Electrical Engineering; pp. 262-265; McGraw-Hill, New York, 1937.
Liwschitz-Garik et al., Electric Machinery, pp. 106-113, Van-Nostrand Co., New York.
Still et al., Elements of Electrical Machine Design; pp. 180-186, McGraw Hill, New York, 1954.
McFarland, A. C. Machines, pp. 254-260, Van Nostrand Co., New York, 1948.
Winding Alternating Current Machines by Liwschitz-Garik & Gentilini, Datarule Pub. Co., New Canaan, Conn., 1975.

Primary Examiner—R. Skudy
Attorney, Agent, or Firm—John M. Haurykiewicz; Daniel D. Fetterley

[57] ABSTRACT

A stator winding configuration employs graded, overlapping stator winding coil groups. The outer coils of the coil group have a reduced number of turns with respect to the center coil or coils of the group. The coil groups have an expanded coil group width. The outer coils of adjacent, expanded width coil groups are overlapped by placing the reduced turn outer coils in common slots in the stator core.

17 Claims, 12 Drawing Figures

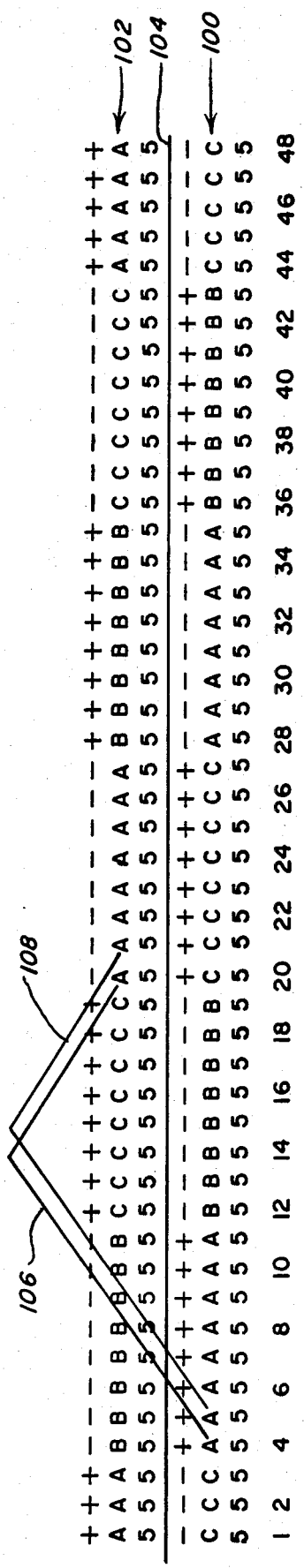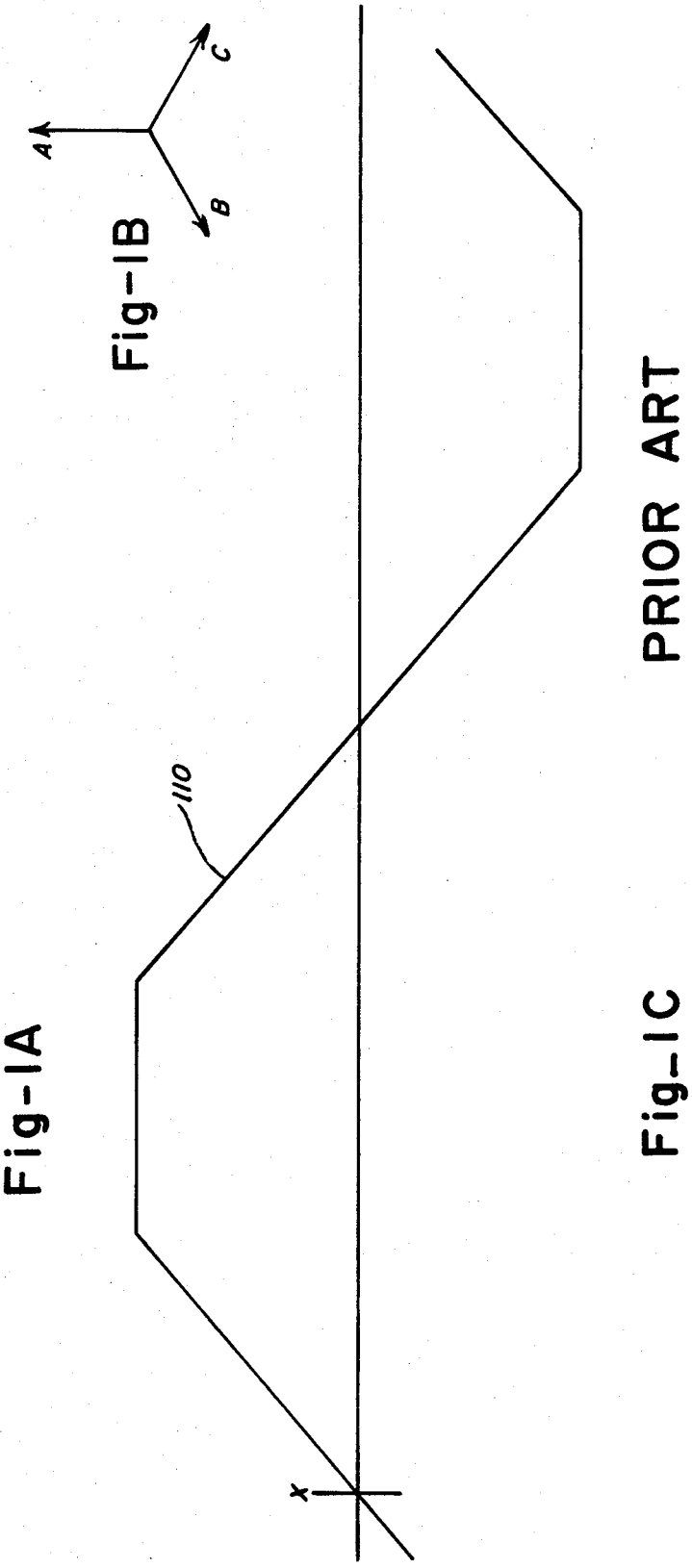
Fig-1A
Fig-1B
Fig-1C PRIOR ART

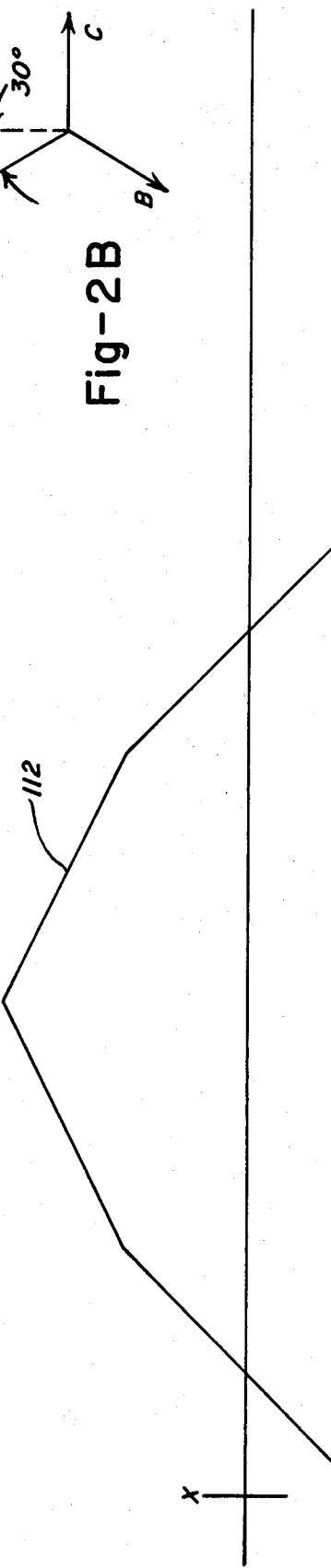
Fig-2A
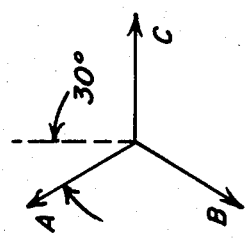
Fig-2B
Fig-2C  PRIOR ART

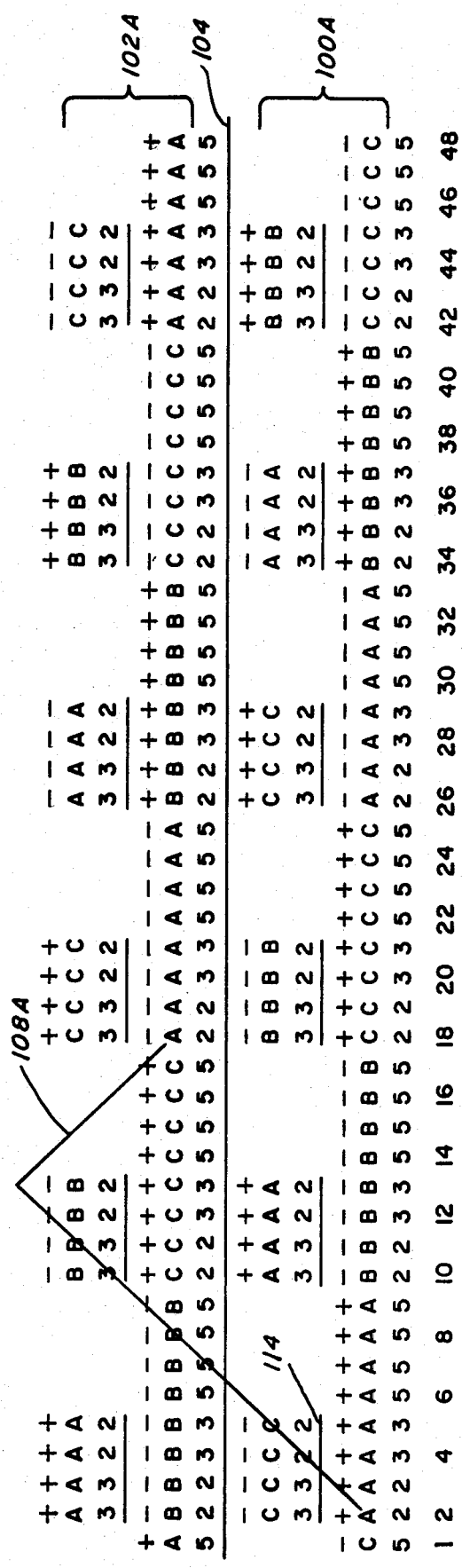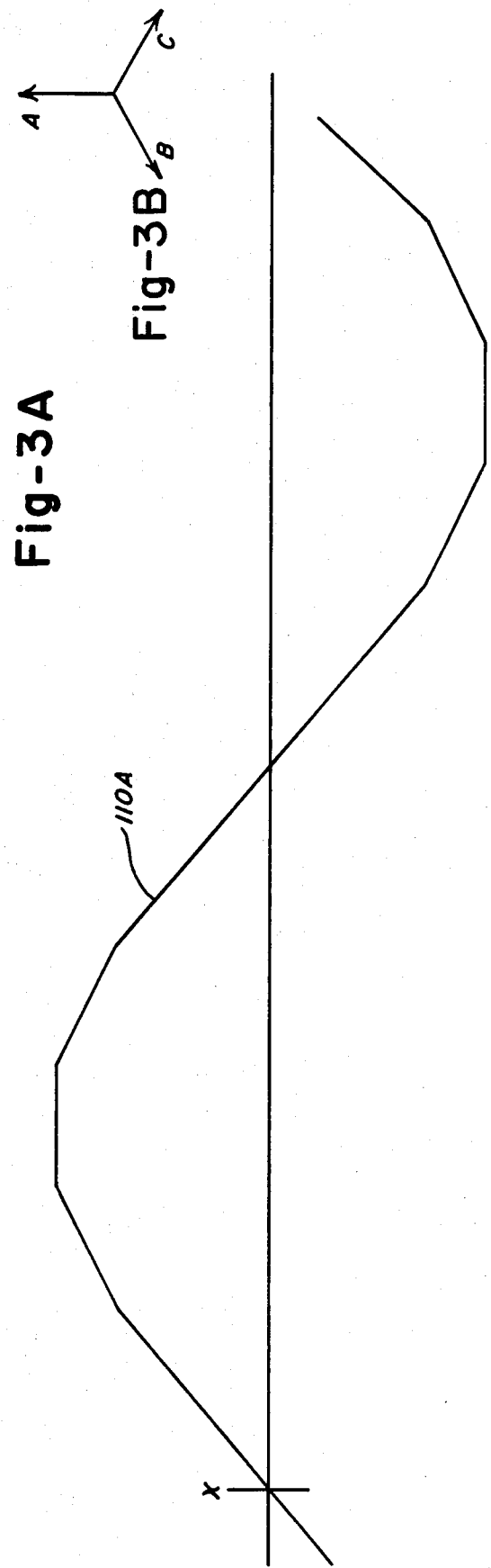

STATOR WINDING PROVIDING MAGNETOMOTIVE FORCE WAVE OF REDUCED HARMONIC CONTENT

BACKGROUND OF THE INVENTION

The present invention relates to an improved stator winding configuration for alternating current machines. The winding configuration of the present invention obtains a more sinusoidal shape in the magnetomotive force and flux wave employed in the machine. This improves the speed-torque curve and efficiency of an a.c. motor. Stray load losses, heating, noise, and vibration are reduced. When employed in an a.c. generator, the winding configuration improves the output voltage wave form.

In the following, the polyphase alternating current machine is described as an a.c. motor, it being understood that the description is applicable by analogy to an a.c. generator, or alternator. An a.c. motor has a stator winding that produces a rotating magnetic field when energized by polyphase alternating current. The rotating magnetic field of the stator rotates the rotor by electrodynamic interaction between the field and current carrying conductors in the rotor. The speed of the rotor is determined by the number of poles in the stator winding and the frequency of the applied alternating current.

The stator winding consists of a plurality of turns of wire collected into coils. The two sides of the coils are placed in slots in the stator core. The stator core is typically formed of a stack of ferrous metal laminations. The stator slots open along the air gap of the machine between the rotor and the stator core. End turns lying at each end of the stator core connect the sides of the coils in the slots. The coils are electrically connected together to form the stator winding.

At a minimum the stator winding must possess at least one coil for each a.c. phase for each north-south magnetic field pole pair. Thus, for a three phase, two pole (i.e. north-south pole pair) machine, there must be at least three coils: for a three phase, four pole machine there must be at least six coils, and so on. In a practical machine, a plurality of coils are used in defining the poles of the machine rather than a single coil. The plurality of coils defining each pole are grouped together and electrically connected. Similarly in a practical machine, the most commonly encountered winding configuration is of the two layer lap wound type. In such a winding, there is usually two coil groups per pole so a two pole, three phase machine will have six groups of coils: a four pole, three phase machine will have twelve coil groups, etc.

The rotating magnetic field is produced by the rotating magnetomotive force (MMF) wave established in the motor by the ampere-turns of the coils in the stator winding when energized by polyphase alternating current. The MMF wave and magnetic field wave in the motor generally correspond in shape, subject to the saturation effects of the ferromagnetic material used to form the stator core.

The rotating MMF wave contains harmonic frequencies as well as the fundamental component. This is due in part to the discrete distribution of the individual coils of the groups in the slots of the stator core. It is also due to the combination of the fields produced by the three separate phase windings in the stator. The MMF wave is not sinusoidal in shape, but changes in shape with time from a generally triangular shape to a generally trapezoidal shape responsive to the polyphase current energization.

Some of the harmonics produced in the MMF wave form rotate in the same direction as the main or fundamental component of the wave, but at a different speed than the fundamental. Others move in the opposite direction from the fundamental component of the MMF wave.

These harmonics moving at different speeds and directions produce numerous undesirable effects in the operation of the motor. Such effects include aberrations in the speed-torque curve due to parasitic torques generated by the harmonic flux waves. Additional stray load losses appear when load current flows in the machine. Increased heating from eddy currents and other sources occurs in the motor. Greater noise and vibration is also produced.

Because of these undesirable effects, efforts have been made to reduce the harmonic content of the MMF wave. These efforts are generally directed to making the MMF wave more sinusoidal. They involve the use of chorded coils, altering the distribution of the stator coils in the stator slots, and the use of skewed stator slots.

In skewing the stator slots, the slots are moved out of alignment with the rotor shaft so as to form a slightly helical pattern on the air gap surface of the stator core. This primarily reduces higher order harmonics.

The use of chorded coils involves coils of less than full pitch. In a full pitch coil, the sides of the coil lying in the stator slots are 180 electrical degrees apart. This may perhaps best be understood in a two pole machine in whch mechanical degrees and electrical degrees are the same. At full pitch, one side of a given coil would be positioned in the stator core diametrically opposite the other side, i.e. the sides of the coils would be angularly displaced 180° about the stator. With a chorded coil of less than full pitch, one side of the coil is displaced less than 180° from the other side, for example, 150°. Pitch is usually expressed in terms of percent, the above example illustrating a pitch of 83.3%. Or it may be expressed in terms of a pitch factor, as 0.833.

To reduce the harmonics, the pitch of the chorded coils is selected such that the pitch factor for the undesirable harmonics, such as the fifth and seventh harmonics is much less than that of the fundamental component.

However, in the case of a two pole machine, it is difficult to provide the desired pitch factor in the coils. This is due to the large, awkward coil end turns in such a machine. These raise manufacturing problems and are subject to space limitations in the motor. It may thus not be possible to obtain a preferred pitch factor in the coils and the resulting reduction of the harmonic content of the MMF wave.

Because of the constraints on pitch factor, coil distribution is left as a means for reducing harmonic content. By proper selection of the number of slots in the stator and the number of coils per group, some reduction in the harmonic losses can be obtained. However, undesirable harmonic content may still amount to as much as 20% of the fundamental component.

A further attempt in this direction is the so-called "interspersed" or "cyclic shift" winding configuration described in "Winding Alternating-Current Machines" by Michael Liwschitz-Garik and Celso Gentilini, published by Datarule Publishing Co., Inc., New Canaan, CT and in an earlier version of the same work authored by Liwschitz-Garik and published by van Nostrand and Co., 1950.

In an ordinary machine, the coils are distributed in the slots so that coils of the same group are adjacent. Each coil group typically occupies 60 electrical degrees in a three phase machine. A typical configuration for a two pole machine having four coils for the coil group of each phase would be as follows. In the following example, the cylindrical surface of the stator along the air gap has been unrolled to form a straight line. A, B, and C represent the three phases of the alternating current. The diagram below represents the coil sides in the bottom of the stator slots of a two layer lap wound stator winding. The top coil sides, not shown, are inserted in the slots, a coil pitch away, to form the top layer of coil sides in the stator slots. Since the pattern of top coil sides in the slots duplicates the pattern of the bottom coil sides, only the bottom coil sides are shown. The plus and minus designations represent the relative direction of a current in a conductor compared to the others of the same phase. Thus, if the current is flowing into a conductor marked A+, it would be flowing out of a conductor marked A−. The winding is as follows.

| + | + | + | + | − | − | − | − | + | + | + | + | − | − | − | − | + | + | + | + | − | − | − | − |
|---|---|---|---|---|---|---|---|---|---|---|---|---|---|---|---|---|---|---|---|---|---|---|---|
| A | A | A | A | B | B | B | B | C | C | C | C | A | A | A | A | B | B | B | B | C | C | C | C |

In an interspersed winding, the outer coils of the groups are moved outwardly from the center of the group, thereby effectively increasing the width of the coil group as follows.

| + | − | + | + | − | + | − | − | + | − | + | + | − | + | − | − | + | − | + | + | − | + | − | − |
|---|---|---|---|---|---|---|---|---|---|---|---|---|---|---|---|---|---|---|---|---|---|---|---|
| A | C | A | A | B | A | B | B | C | B | C | C | A | C | A | A | B | A | B | B | C | B | C | C |

By comparing the two windings shown above, it can be seen, for example, in connection with the C+ coil sides, that in the conventional configuration, all the C+ coil sides in the C+ coil group are adjacent. In the interspersed winding, the outer C+ coil sides in the coil group have been displaced outwardly one stator slot. An outer B− coil side and an outer A− coil side are placed where the outer C+ coil sides used to be so that each stator slot still contains one coil. This interspersion of the coil sides gives rise to the "interspersed" designation of the winding. The amount of undesirable MMF wave harmonic content attributable to coil distribution is less in an interspersed winding than in a winding of conventional distribution. This is due to a more sinusoidal form of MMF wave produced by an interspersed winding.

BRIEF SUMMARY OF THE INVENTION

By contrast to either the conventional stator winding, or the interspersed stator winding, the present invention employs a configuration that is best described as a graded, overlapping stator winding configuration. In the winding of the present invention, what would otherwise be the outer coils of the coil group of a conventional winding are divided into two or more coils, each having less than the number of turns of the center coil or coils. The reduced turn coils are placed in slots adjacent the center coils. The result is an expanded coil group width. The expanded coil group width necessitates that the outer coils of adjacent coil groups be overlapped.

For example, a conventional stator winding has the configuration described above. A C coil group portion of a conventional stator winding is repeated below. The numeral 6 indicates there are six turns per coil.

| C | C | C | C |
|---|---|---|---|
| 6 | 6 | 6 | 6 |

An example of a graded coil for the C coil group in accordance with the present invention is as follows.

| C | C | C | C | C | C |
|---|---|---|---|---|---|
| 3 | 3 | 6 | 6 | 3 | 3 |

The outer coils on each side of the coil group have been divided into two coils each with three turns. The reduced turn coils are placed in adjacent slots so that the coil group now occupies six stator slots rather than four stator slots. This necessitates overlap with adjacent coil groups.

Referring again to the conventional stator winding, it has the configuration below.

| B | B | B | B | C | C | C | C | A | A | A | A |
|---|---|---|---|---|---|---|---|---|---|---|---|
| 6 | 6 | 6 | 6 | 6 | 6 | 6 | 6 | 6 | 6 | 6 | 6 |

With the expanded coil group width in the stator winding configuration of the present invention, the overlap is as follows.

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| C | C |   |   | A | A |   |   | B | B |   |   | C | C |   |   |
| 3 | 3 |   |   | 3 | 3 |   |   | 3 | 3 |   |   | 3 | 3 |   |   |
| A | A | A | A | B | B | B | B | C | C | C | C | A | A | A | A |
| 3 | 3 | 6 | 6 | 3 | 3 | 6 | 6 | 3 | 3 | 6 | 6 | 3 | 3 | 6 | 6 |

The numbers across the top indicate stator slot numbers. It can thus be seen that the reduced turn coils of each coil group overlap with reduced turn coils of the adjacent coil group. For example, in stator slot No. 5 there is a three turn B coil and a three turn A coil. The same is true of stator slot No. 6. In each of stator slots Nos. 7 and 8 there is one six turn B coil. In stator slot No. 9, there is one three turn B coil and one three turn C coil, and so on. In the diagram, above, only the bottom coil sides of the coil groups are shown. The pattern is duplicated for the top coil sides.

The graded, overlapping stator winding configuration of the present invention provides a highly desirable sinusoidal-like form to the MMF wave. The result is a reduction in harmonic content of the MMF wave with the attendant advantages. While applicable to most types of a.c. machines, the stator winding of the present invention is particularly suitable for use in two pole machines where increases of 0.5% in efficiency are deemed obtainable. While seemingly small, a two pole a.c. machine may already be operating at 94% efficiency so that the incremental increase is significant.

The stator winding of the present invention also permits the designer a great deal of flexibility in the selection of the number of coils per group to be split and the number of turns to be provided in each reduced turn coil. The stator winding may be so configured as to achieve the desired results under a wide variety of application criteria.

Further examples of the stator winding configuration of the present invention are given below.

BRIEF DESCRIPTION OF THE DRAWINGS

In the drawing:

FIG. 1A diagrammatically shows a conventional stator winding.

FIG. 1B shows one instantanous condition of polyphase alternating current energization.

FIG. 1C shows the MMF wave resulting from energization of the winding at the instantaneous condition of polyphase alternating current energization shown in FIG. 1B.

FIG. 2A shows the conventional stator winding of FIG. 1A.

FIG. 2B shows a subsequent condition of polyphase alternating current energization.

FIG. 2C shows the MMF wave for the stator winding of FIG. 2A for the subsequent condition of polyphase alternating current energization of FIG. 2B.

FIG. 3A diagrammatically shows a stator winding of the present invention.

FIG. 3B shows the same instantaneous condition of polyphase alternating current as in FIG. 1B.

FIG. 3C shows the MMF wave resulting from energization of the winding by polyphase alternating current having the instantaneous condition of FIG. 3B.

DETAILED DESCRIPTION

Figures 4A, 4B, 4C:
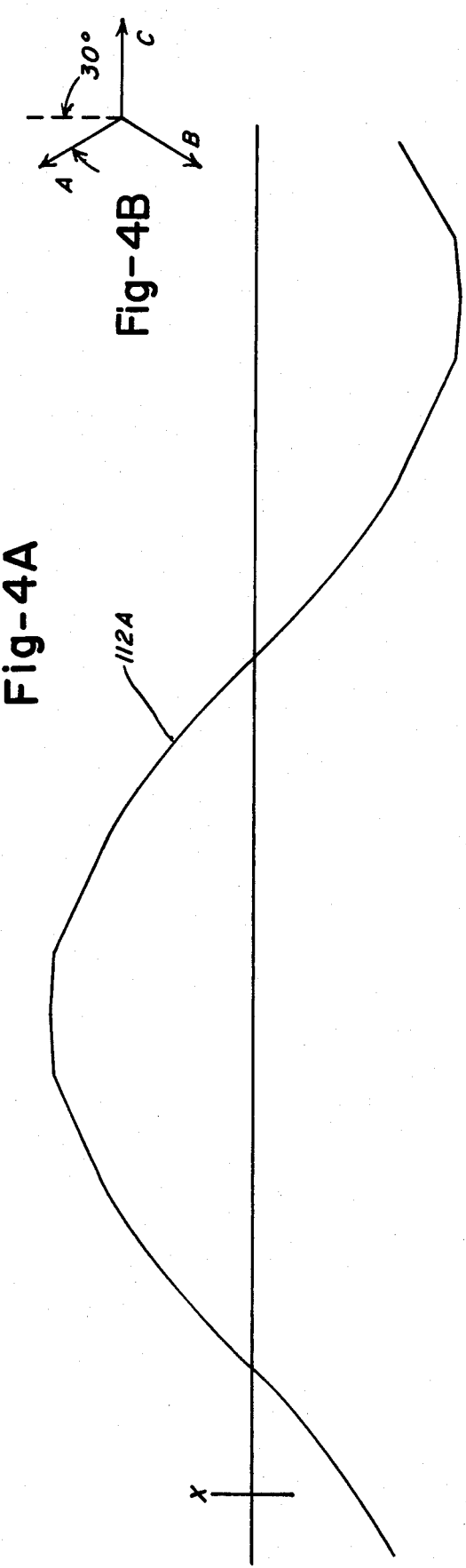
FIG. 4A shows the stator winding of FIG. 3A.
FIG. 4B shows the same instantaneous condition of the polyphase alternating current of FIG. 2B.
FIG. 4C shows the MMF wave for the stator winding of FIG. 4A for the instantaneous condition of the polyphase alternating current shown in FIG. 4B.

FIG. 1A shows, in diagrammatic form, a conventional two layer, lap wound stator winding of a two pole, three phase alternating current motor. The otherwise cylindrical air gap surface of the stator has been unrolled to form a straight line and the coils of the stator winding are shown in a corresponding position. The slots of the stator containing the coils are not shown to facilitate the description of the invention. The stator has forty eight slots, the position of which is indicated by the numbers 1-48 in FIG. 1A. The stator winding has two layers, bottom or inner layer 100 and top or outer layer 102. Sides from two different coils lie in each stator slot. The coil sides in each slot are separated by an insulator. While this has been diagrammatically indicated in FIG. 1A by the line 104, it will be appreciated that the line 104 actually represents individual insulators in each of the stator slots.

Each layer of the winding has two coil groups for each of the A, B, and C phases of the alternating current. Each coil group has eight individual coils. Each coil may have five turns. The positive and negative indications are used to indicate the direction of current flow in the coil sides in the various slots of the stator.

The sides of the coils are placed in the stator slots in the pattern shown in FIG. 1A. One side of the first coil of the A group is laid in bottom layer 100 in stator slot 1 and designated the (+) side. The other side of this coil is laid in top layer 102 in stator slot 17 and designated the (−) side. The sides of the coil in these slots are connected by end turns, one of which is illustrated diagrammatically by the line 106 connecting the (+) and (−) sides of the coil in FIG. 1A. As noted above, for a two pole machine, a full pitch coil would have the sides 180° apart. For a full pitch coil, the (−) side of the coil described above would lie in stator slot 25. Since the (−) side lies in stator slot 17, the coil is less than full pitch. Its pitch is 66.7%.

One side of the second coil of the A coil group is laid in the bottom layer 100 in stator slot 2 and designated the (+). The other side of this coil is laid in top layer 102 in stator slot 18 and designated the (−) side. The end turn connecting these coils is also shown by line 108. The foregoing pattern is continued to complete the stator winding.

FIG. 1B shows an instantaneous polyphase current energization for the phases A, B, and C in vectorial form. FIG. 1C shows the resulting MMF wave 110 for the stator winding of FIG. 1A. MMF wave 110 is obtained by the algebraic summation of the MMF's produced by the ampereturns in each of the individual coils in the stator winding when so energized. The MMF wave is generally trapezoidal in configuration at this instant in time. While the wave is shown for purposes of simplicity in a smooth configuration in FIG. 1C, it will be appreciated that the wave is formed by the incremental amounts of MMF provided by each individual coil. The slanting sides are thus actually of an incrementally stepped configuration.

FIGS. 2A-C show the energization of the conventional stator winding of FIGS. 1A and 2A for an instantaneous current condition shown by FIG. 2B and which is subsequent to that of FIG. 1B, as indicated by the 30% rotation of the A, B, and C current vectors. The MMF wave 112 produced by that current energization is shown in FIG. 2C.

Two observations may be made by a comparison of FIGS. 1C and 2C. First, the wave form has shifted to the right going from FIG. 1C to FIG. 2C. The point X marks a zero crossing of the MMF wave 110 in FIG. 1C. The same point is carried forward to FIG. 2C to show the rightward shift of the MMF wave 112. This shift in the MMF wave provides the rotating field in the a.c. motor necessary to rotate the rotor.

Second, and of particular interest to the present invention, it can readily be seen that the MMF wave form has changed from one of trapezoidal configuration in FIG. 1C to one of generally triangular configuration in FIG. 2C. This change in the MMF wave form generates the undesired harmonics moving at different speeds and/or direction than the fundamental component, with the resulting detriment to the operation of the motor.

FIGS. 3A and 4A show the stator winding configuration of the present invention. FIGS. 3C and 4C show the resulting MMF wave forms. As noted in the summary of the present invention, its gist is to divide the outer coils of a coil group into two or more coils of fewer turns than the center coils or place them in stator slots adjacent to the stator slots containing the center coils of the coil group. This provides a graded turn number arrangement to the coils of the group and an expanded coil group width. In a simple example of the winding of the present invention, the change in the coils of a group may be from

| C | C | C | C | to | C | C | C | C | C | C |
|---|---|---|---|----|---|---|---|---|---|---|
| 6 | 6 | 6 | 6 |    | 3 | 3 | 6 | 6 | 3 | 3 |

The number 6 indicates there are 6 turns in a coil so designated.

The expansion of the coil group width from four slots to six slots necessitates placing the four reduced turn coils in stator slots containing reduced turn coils from other coil groups, as

| B | B |   |   | A | A |
|---|---|---|---|---|---|
| 3 | 3 |   |   | 3 | 3 |
| C | C | C | C | C | C |
| 3 | 3 | 6 | 6 | 3 | 3 |

The result is an overlapping of the coils of the various coil groups.

Because of the manner in which the coils are customarily assembled into a stator winding in an actual manufacturing process, the portion of the stator winding shown immediately above would typically be configured as follows:

| B | B |   |   | C | C |
|---|---|---|---|---|---|
| 3 | 3 |   |   | 3 | 3 |
| C | C | C | C | A | A |
| 3 | 3 | 6 | 6 | 3 | 3 |

FIG. 3A shows one embodiment of a two layer, lap wound stator winding configuration of the present invention. The graded configuration for each coil group in the embodiment of the invention shown in FIG. 3A is as follows.

| C | C | C | C | C | C | C | C | C | C | C | C |
|---|---|---|---|---|---|---|---|---|---|---|---|
| 2 | 2 | 3 | 3 | 5 | 5 | 5 | 5 | 3 | 3 | 2 | 2 |

For analytical purposes, the coil group configuration shown in FIG. 3A may be considered to have been derived from the standard coil group configuration shown in FIG. 1A by dividing each of the two outer coils on either side of four center coils into two reduced turn coils. There is a net increase of four coils in the coil group so that the number of slots occupied by the coil group has been expanded from the eight slots shown in FIG. 1A to the twelve slots shown in FIG. 3A. The four central coils of the phase group have 5 turns whereas the eight reduced turn outer coils variously have 3 turns or 2 turns.

The overlap is as follows:

|   | B | B | B | B |   |   |   |   | C | C | C | C |   |
|---|---|---|---|---|---|---|---|---|---|---|---|---|---|
|   | 3 | 3 | 2 | 2 |   |   |   |   | 3 | 3 | 2 | 2 |   |
| B | C | C | C | C | C | C | C | C | A | A | A | A | A |
| 5 | 2 | 2 | 3 | 3 | 5 | 5 | 5 | 5 | 2 | 2 | 3 | 3 | 5 |

The above diagram shows a portion of one of the layers of the two layer, lap wound winding. It will be seen that each stator slot, whether it contains one coil or two coils of the layer has the same total number of turns in it, that is five turns. This arrangement is preferable in the present invention as it provides uniform slot fill. However, it is not essential.

FIG. 3A shows a complete stator winding of this configuration having two main layers 100A and 102A with insulator 104A shown diagrammatically between the two main layers. Additionally, insulators are placed between the reduced turn coils, as in each of stator slots Nos. 2, 3, 4, and 5. This is diagrammatically shown by the line 114. The coils retain the same pitch as in FIG. 1A, also shown diagrammatically in FIG. 3A by the single end turn 108A.

FIG. 3C shows the MMF wave 110A produced by the stator winding configuration of the present invention. It will be immediately seen that the MMF wave more closely approximates the desired sinusoidal configuration than the MMF waves shown in either FIGS. 1C or 2C, thereby indicating reduced harmonic content.

FIG. 4C shows the MMF wave 112A subsequent to vectorial rotation of the polyphase alternating current energization by 30°. It can be seen that the MMF wave is both nearly sinusoidal and generally resembles the wave of FIG. 3C. The stator winding configuration of the present invention thus produces an MMF wave in which the MMF harmonics that move at different speeds than the fundamental component and/or move in the opposite direction are reduced. The operation of the motor is thereby enhanced.

Several specific embodiments of the invention have been described above. It will be appreciated that for a given number of coils in a coil group, a table of various configurations can be prepared so that the coil configuration producing the best results can be selected for incorporation in the motor. For example, for a four coil group used for explanatory purposes above, the various configurations would be as follows. The center coils may be considered to have six turns.

|   |   | A | A | A | A |   | (conventional) |
|---|---|---|---|---|---|---|---|
|   |   | 6 | 6 | 6 | 6 |   |   |
| A |   | A | A | A | A | A |   |
| 1 |   | 5 | 6 | 6 | 5 | 1 |   |
| A |   | A | A | A | A | A |   |
| 2 |   | 4 | 6 | 6 | 4 | 2 |   |
| A |   | A | A | A | A | A |   |
| 3 |   | 3 | 6 | 6 | 3 | 3 |   |
| A |   | A | A | A | A | A |   |
| 4 |   | 2 | 6 | 6 | 2 | 4 |   |
| A |   | A | A | A | A | A |   |
| 5 |   | 1 | 6 | 6 | 1 | 5 |   |

The configurations shown immediately above provide uniform fill in the stator slots. It is also possible to use configurations such as those shown below in which the resulting winding configuration resembles a so-called "dropped turn" configuration.

| A | A | A | A | A | A |
|---|---|---|---|---|---|
| 1 | 4 | 6 | 6 | 4 | 1 |
| A | A | A | A | A | A |
| 1 | 3 | 6 | 6 | 3 | 1 |
|   |   |   | or |   |   |
| A | A | A | A | A | A |
| 3 | 1 | 6 | 6 | 1 | 3 |

These coil groups do not provide the same number of turns in each stator slot.

It is also possible to provide complete grading of the coils of a coil group in which no adjacent coils have the same number of turns, such as

| A | A | A | A | A | A | A |
|---|---|---|---|---|---|---|
| 1 | 2 | 4 | 6 | 4 | 2 | 1 |

It is also possible to use turn arrangements which are not symmetrical about the center line of the group.

While the instant invention has been disclosed with reference to a particular embodiment thereof, it is to be appreciated that the invention is not to be taken as limited to all of the details thereof, as modifications and variations thereof may be made without departing from the spirit or scope of the invention.

I claim:

1. A stator winding for a polyphase a.c. machine, said stator winding having a plurality of coils formed of turns of wire lying in a plurality of stator slots spaced along an air gap surface of a stator core, said coils being connected into groups of coils lying in adjacent stator slots for polyphase alternating current operation, each of said coil groups having at least one central coil with a predetermined number of turns and at least two outer coils, one of which lies on either side of said central coil, said outer coils containing reduced turns with respect to said central coil to provide a graded coil turn configuration to the coil group, the reduced turn coils of coil groups that are adjacent along the air gap surface of the stator core occupying common stator slots so that coils of adjacent coil groups overlap.

2. The stator winding according to claim 1 wherein each coil group has a plurality of reduced turn coils lying on either side of said central coil.

3. The stator winding according to claim 1 wherein each coil group has a plurality of central coils.

4. The stator winding according to claim 1 wherein the sum of the turns of one of said reduced turn coils are so selected and the turns of one of said reduced turn coils from a coil group adjacent said selected coil group in a common stator slot equals the number of turns in said central coil.

5. The stator winding according to claim 1 wherein the sum of overlapping turns of said reduced turn coils from adjacent coil groups in a common stator slot differs from the number of turns in said central coil.

6. The stator winding according to claim 5 wherein the total number of coil turns in a common stator slot is less than the number of turns in said central coil.

7. The stator winding according to claim 2 wherein the total number of coil turns in a common stator slot equals the number of turns in said central coil.

8. The stator winding according to claim 2 wherein the total number of coil turns in a common stator slot differs from the number of turns in said central coil.

9. The stator winding according to claim 8 wherein the total number of coil turns in a common stator slot is less than the number of turns in said central coil.

10. The stator winding according to claim 1 wherein said coil group has a central axis defined by said central coil and wherein the configuration of the turns of the reduced turn coil on either side of said central axis is symmetrical about said central axis.

11. The stator winding according to claim 2 wherein said coil group has a central axis defined by said central coil and wherein the configuration of the turns of the reduced turn coils on either side of the central axis is symmetrical about the central axis.

12. The stator winding according to claim 1 wherein said coil group has a central axis defined by said central coil and wherein the configuration of the turns of the reduced turn coil on either side of the central axis is asymmetrical about the central axis.

13. The stator winding according to claim 2 wherein said coil group has a central axis defined by said central coil and wherein the configuration of the turns of the reduced turn coils on either side of the central axis is asymmetrical about the central axis.

14. The stator winding according to claim 1 wherein there is a single layer of central coils in the stator slots.

15. The stator winding according to claim 1 wherein the stator winding is of the lap wound type.

16. The stator winding according to claim 1 in an a.c. motor.

17. The stator winding according to claim 1 in an a.c. generator.

* * * * *